US012781777B2

(12) United States Patent
Breuer et al.

(10) Patent No.: US 12,781,777 B2
(45) Date of Patent: Nov. 3, 2026

(54) FASTENER

(71) Applicant: fischerwerke Gmbh & Co. KG, Waldachtal (DE)

(72) Inventors: Harald Breuer, Baiersbronn (DE); Joachim Lehmann, Dornstetten (DE); Jan Zimmermann, Horb a.N. (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 233 days.

(21) Appl. No.: 18/853,211

(22) PCT Filed: Mar. 29, 2023

(86) PCT No.: PCT/EP2023/058078
§ 371 (c)(1),
(2) Date: Oct. 1, 2024

(87) PCT Pub. No.: WO2023/198449
PCT Pub. Date: Oct. 19, 2023

(65) Prior Publication Data

US 2025/0215908 A1 Jul. 3, 2025

(30) Foreign Application Priority Data

Apr. 12, 2022 (DE) ...................... 10 2022 108 903.7
Jan. 9, 2023 (DE) ...................... 10 2023 100 303.8

(51) Int. Cl.
*F16B 2/04* (2006.01)
*F16B 37/04* (2006.01)

(52) U.S. Cl.
CPC .............. *F16B 2/04* (2013.01); *F16B 37/041* (2013.01)

(58) Field of Classification Search
CPC ........... F16B 2/04; F16B 37/041; F16B 43/00
USPC ............................................................ 411/15
See application file for complete search history.

(56) References Cited

U.S. PATENT DOCUMENTS 4,138,779 A 2/1979 Weber
4,428,705 A 1/1984 Gelhard
4,531,797 A * 7/1985 Jullien .................. H01R 4/301 439/813
5,682,678 A 11/1997 Gallagher et al.
2004/0060256 A1 4/2004 Frascari
2015/0285285 A1 10/2015 Burbach
(Continued)

FOREIGN PATENT DOCUMENTS

CH 156680 A 8/1932
DE 19 61 489 A 7/1970
DE 30 42 432 A1 5/1982
(Continued)

OTHER PUBLICATIONS

International Search Report for corresponding Application No. PCT/EP2023/058078, mailed Jun. 27, 2023.
(Continued)

*Primary Examiner* — Jason D Shanske
(74) *Attorney, Agent, or Firm* — Renner, Otto, Boisselle & Sklar, LLP

(57) ABSTRACT

A fastener for a thin plate, including a slotted bell-shaped claw which expands by being axially clamped between a circular counter bearing and a tensioner and which thereby engages under a cover layer of the plate in an annular groove provided in the plate.

15 Claims, 4 Drawing Sheets

(56) References Cited

U.S. PATENT DOCUMENTS

| | | | | |
|---|---|---|---|---|
| 2017/0227038 | A1 | 8/2017 | Blum et al. | |
| 2022/0299062 | A1* | 9/2022 | Kempf | F16B 5/0628 |

FOREIGN PATENT DOCUMENTS

| | | | | |
|---|---|---|---|---|
| DE | 696 16 818 | T2 | 6/2002 | |
| DE | 10 2012 110 868 | A1 | 5/2014 | |
| DE | 10 2014 106 557 | A1 | 11/2015 | |
| EP | 1538350 | B1 * | 2/2007 | F16B 37/0864 |
| FR | 2824877 | A1 | 11/2002 | |
| GB | 743651 | A | 1/1956 | |
| WO | 2016/146567 | A1 | 9/2016 | |
| WO | 2018/218024 | A1 | 11/2018 | |

OTHER PUBLICATIONS

Written Opinion for corresponding Application No. PCT/EP2023/058078, mailed Jun. 27, 2023.

Search Report for corresponding German Application No. 10 2022 108 908.8, dated Nov. 21, 2022.

English Translation of International Preliminary Report on Patentability issued for corresponding International Application No. PCT/EP2023/058078, mailed Oct. 24, 2024.

* cited by examiner

FASTENER

TECHNICAL FIELD OF THE INVENTION

The invention relates to a fastener for fastening in a recess of a component and a fastening arrangement with such a fastener. The fastener is provided in particular for fastening in a low, circular recess in, for example, a thin plate, in particular an aluminum composite plate with a mineral core.

BACKGROUND OF THE INVENTION

The published patent application DE 1 961 489 A1 discloses a fastener with a claw that has the shape of a perforated disk with a frustoconical, circumferential outer edge divided into segments by slots. For fastening, the outer edge of the claw is inserted into a circular and inclined, i.e. also frustoconical, annular groove in a plate, for example, in such a way that the frustoconical, circumferential outer edge of the claw engages under or behind the likewise frustoconical annular groove in the plate.

SUMMARY OF THE INVENTION

The object of the invention is to propose a fastener with an expandable claw and a fastening arrangement with such a fastener.

The fastener according to the invention comprises a clamping axle, a bell-shaped claw, a tensioner on an outer side of the claw and a counter bearing on an inner side of the claw. The term "bell-shaped" refers in particular to a plate-shaped, dome-like, 2-dimensionally curved body with an axially parallel or frustoconical and annular section on an outer edge of the claw, wherein the section on the outer edge can be curved in the axial direction. The claw can be rounded or angular in both the axial and radial directions. A convex side is referred to here as the outer side and a concave side as the inner side of the claw, wherein "convex" and "concave" refer to both a rounded and an angular shape of the claw.

The counter bearing is located on or in the concave inner side of the claw and in a radial direction to the tensioning axis between the outer edge of the claw and the tensioning axis.

The tensioner is located on the convex outer side of the claw opposite the counter bearing and can be moved axially or parallel to the tensioning axis in the direction of the counter bearing for expanding the claw, wherein the tensioner acts upon the claw, starting from an untensioned state, axially between the tensioning axis and the counter bearing. By means of the tensioner, the claw can be acted upon radially within the counter bearing towards the counter bearing, wherein the claw is pressed against the counter bearing, as a result of which the claw is pivoted about an annular pivot line surrounding the tensioning axis. The pivot line is defined or formed by the counter bearing. It can be circular, non-circular round, for example elliptical or oval, or angular. The pivoting of the bell-shaped claw upon its acting upon by the tensioner against the counter bearing can also be understood as pivoting about one or more pivot axis/es that are tangential to the tensioning axis at various points on a circumference about the pivot axis. "Tangential" means a straight line in a radial plane of the tensioning axis and at a radial distance from the tensioning axis. Due to the pivot movement, the claw of the fastener according to the invention expands, i.e. the outer edge of the claw increases its radial distance from the tensioning axis.

Preferably, the claw, the tensioner and the counter bearing are coaxial to the tensioning axis.

For fastening to a component, for example to a plate, the outer edge of the claw of the fastener according to the invention is inserted into a recess, for example an annular groove or a countersink, in particular a cylindrical countersink, in the component and the claw is expanded. Due to the expansion of the claw, the outer edge of the claw is pressed radially outwards and thus from the inside against a circumferential wall of the recess in the component and in this way the claw is fixed in the recess in the component by force fit and/or form fit. As a function of the strength of the component on the circumferential wall of the recess, the outer edge of the claw can be molded into the circumferential wall, as a result of which a form fit of the claw is achieved in the recess of the component.

One advantage of the invention is the possibility of fastening in an axially low recess, for example in an annular groove or in a cylindrical countersink, and thus a fastening to a thin component, for example a plate. The fastener according to the invention is particularly suitable for a plate or generally a component with a stable cover layer and a core or the like with lower mechanical strength under or behind the cover layer, into which the outer edge of the claw can penetrate upon expansion, so that it engages under or behind the stable cover layer of the component. In particular, the component is a composite plate consisting of 0.5 mm thick aluminum cover layers and a 3 mm thick mineral core, which is arranged between the cover layers. However, the fastener is not limited to such composite plates.

Upon the expansion of the claw of the fastener according to the invention, the outer edge of the claw can move exclusively or substantially exclusively radially to the tensioning axis. Preferably, the claw of the fastener according to the invention becomes axially flatter upon expansion in such a way that the outer edge of the claw not only increases its radial distance from the tensioning axis, but also moves axially in the direction of the clamp. As a result, the claw with its outer edge "pulls" its central region radially within its outer edge, the tensioner and the counter bearing in the direction of the component, i.e. the fastener is tensioned, so to speak, in the direction of or against the component to which it is fastened upon expansion in this preferred embodiment of the invention.

In a preferred embodiment of the invention, the bell-shaped claw protrudes axially no more than 3 mm and in particular no more than 2 mm in the direction away from the tensioner over the counter bearing. As a result, an axially "low" fastener that protrudes only slightly from the component to which it is or will be fixed is possible.

Preferably, the fastener according to the invention comprises an annular counter bearing that surrounds the tensioning axis. The counter bearing can be circular or non-circular round and/or angular. Preferably, but not necessarily, the counter bearing surrounds the tensioning axis concentrically. In this preferred embodiment of the invention, the claw pivots about an annular pivot line that surrounds the tensioning axis and defines the counter bearing. The pivot movement is two-dimensional and increases the radial distance between the outer edge of the claw and the tensioning axis.

With one embodiment of the invention, the fastener comprises a threaded shaft that passes through a hole, in particular through a center hole in the claw, and which defines the tensioning axis. The threaded shaft can, for example, be a screw shaft, a threaded bolt or a threaded shaft of the counter bearing. Due to a screwing movement of the tensioner onto the threaded shaft, it enables an axial movement of the tensioner in the tensioning direction, which is directed in the direction of the counter bearing. The axial movement of the tensioner acts upon the claw against the counter bearing, thereby causing the claw to expand.

The tensioner is formed in particular by a nut and a type of washer, wherein the washer is axially acted upon against the claw by rotation of the nut on the threaded shaft in the tensioning direction, which thereby, as described, causes the expanding of the claw. An elastic sealing element can be arranged on the washer, which elastic sealing element is arranged in particular on an outer circumference of the washer and in particular projects so far beyond the washer in the tensioning direction, or extends in the direction of the claw, that when the fastener is used as intended, if it is in a recess of a component to be fastened and the claw is in an expanded state, the sealing element develops a sealing effect between the component and the recess in the component. In other words, the sealing element is designed in such a way that the entry of moisture into the recess of the component is prevented or at least strongly suppressed if the fastener is arranged in the recess and the claw is expanded.

Preferably, the threaded shaft is torsion-resistant and tension-resistant with the counter bearing, in particular the threaded shaft is an integral component of the counter bearing or in any case rigidly connected to the counter bearing. For example, the counter bearing is a washer-shaped screw head or is formed by a washer-shaped screw head of a screw whose screw shaft forms the threaded shaft.

One embodiment of the invention provides slots in the claw that extend from the outer edge of the claw over the counter bearing inwards in the direction of the tensioning axis and end at a distance from the tensioning axis. If the claw comprises a hole or center hole, the slots of the claw end outside the hole or center hole of the claw. The slots divide the claw into expansion segments, which makes it easier to expand the claw. With this embodiment of the invention, an expanding force with which the expansion segments are expanded radially outwards is increased in relation to a clamping force with which the tensioner acts upon the claw axially against the counter bearing.

In a further embodiment of the invention, cutting elements are formed on the outer edge of the claw. In particular, one or more cutting elements are formed on the outer edge of each expanding element. The cutting elements make it easier for the outer edge of the claw to penetrate the circumferential wall of the recess of the component upon the expansion of the claw. In other words, the cutting elements enables a reduction of the force that is required to press the claw into the circumferential wall. This also generally improves the hold of the fastener in the component. "Cutting elements" are understood to mean elements that make it easier for the outer edge of the claw to penetrate the circumferential wall. These can be designed as, for example, cutting edges, knurls, serrations or similar structures.

For forming the counter bearing, one embodiment of the invention provides a counter bearing plate whose circumferential edge or a circumferential edge at a transition from a circumference to an end face of the counter bearing plate facing the claw forms the counter bearing. The transition from the circumference to the end face of the counter bearing plate forming the counter bearing can also be rounded or have a chamfer. The counter bearing plate can, for example, be circular, non-circular round or angular.

A further development of the invention provides a flat end face of the counter bearing plate on a side facing the claw. Another embodiment of the invention, which can also be realized together with the flat end face of the counter bearing plate, provides a flat end face of the tensioner on the side facing the claw. The combination of both options enables an even clamping of the claw between the tensioner and the counter bearing plate.

With one embodiment of the invention, an end face of the clamp facing away from the claw is also level as a contact surface for an attachment part.

Likewise, one embodiment of the invention provides a flat or concave end face of the counter bearing plate on a side facing away from the claw as a contact surface or for forming an annular contact for the component.

The object of the fastening arrangement according to the invention is a component, in particular a previously explained aluminum composite plate with a core, in particular a mineral core, with a recess that comprises a circumferential wall, and the fastener explained above, the claw of which is expanded in the recess of the component in such a way that the outer edge of the claw presses from the inside against the circumferential wall of the recess and is preferably pressed into the circumferential wall of the recess. The outer edge of the claw, which is pressed against the circumferential wall of the recess from the inside, holds the fastener in the recess by force fit (friction fit). There is also a form fit if the outer edge of the claw is pressed into the circumferential wall of the recess of the component. The recess in the component is, for example, an annular groove whose outer groove wall forms the circumferential wall of the recess or, in particular, a cylindrical countersink. The recess, the annular groove or the countersink can be circular, non-circular round or angular. The enumeration is exemplary and not exhaustive. In an expanded state of the fastener in the component, the counter bearing plate is particularly in surface contact with a cover layer of the component, i.e. in particular the cover layer made of aluminum. Due to the tensioner, the counter bearing plate is pressed against the surface layer in the expanded state of the fastener. However, it is also possible that the counter bearing plate is arranged inside the recess, in particular inside the cylindrical depression and below the cover layer, i.e. inside the core. In particular, the diameter of the washer of the tensioner with respect to the tensioning axis is larger than the diameter of the cylindrical countersink, as a result of which the washer in the tensioned state is in particular in contact with the cover layer or is tensioned with the cover layer. As already mentioned, the washer can comprise a sealing element that is in contact with the cover layer in the tensioned state and thus prevents moisture from entering the recess of the component.

With one embodiment of the invention, the component is a thin plate that is no thicker than 5 millimeters. With embodiments of the invention, the recess is at least half as deep as the thickness of the plate.

The features and feature combinations, embodiments, and designs of the invention as mentioned above in the description, as well as the features and feature combinations as mentioned below in the description of figures and/or drawn in a figure, are usable not only in the combination indicated or shown in each case; rather, in principle any other combinations are also usable, or said features can be used individually. Embodiments of the invention are possible which do not have all features of a dependent claim. Individual features of a claim can also be replaced by other disclosed features or feature combinations. Embodiments of the invention are possible which do not have all of the features of the exemplary embodiments, but rather a fundamental arbitrary part of the characterized features of the exemplary embodiment or exemplary embodiments.

BRIEF DESCRIPTION OF THE DRAWING

The invention is explained in more detail below using two exemplary embodiments represented in the drawings. In the drawings.

DETAILED DESCRIPTION OF THE EMBODIMENT(S)

Figure 1:
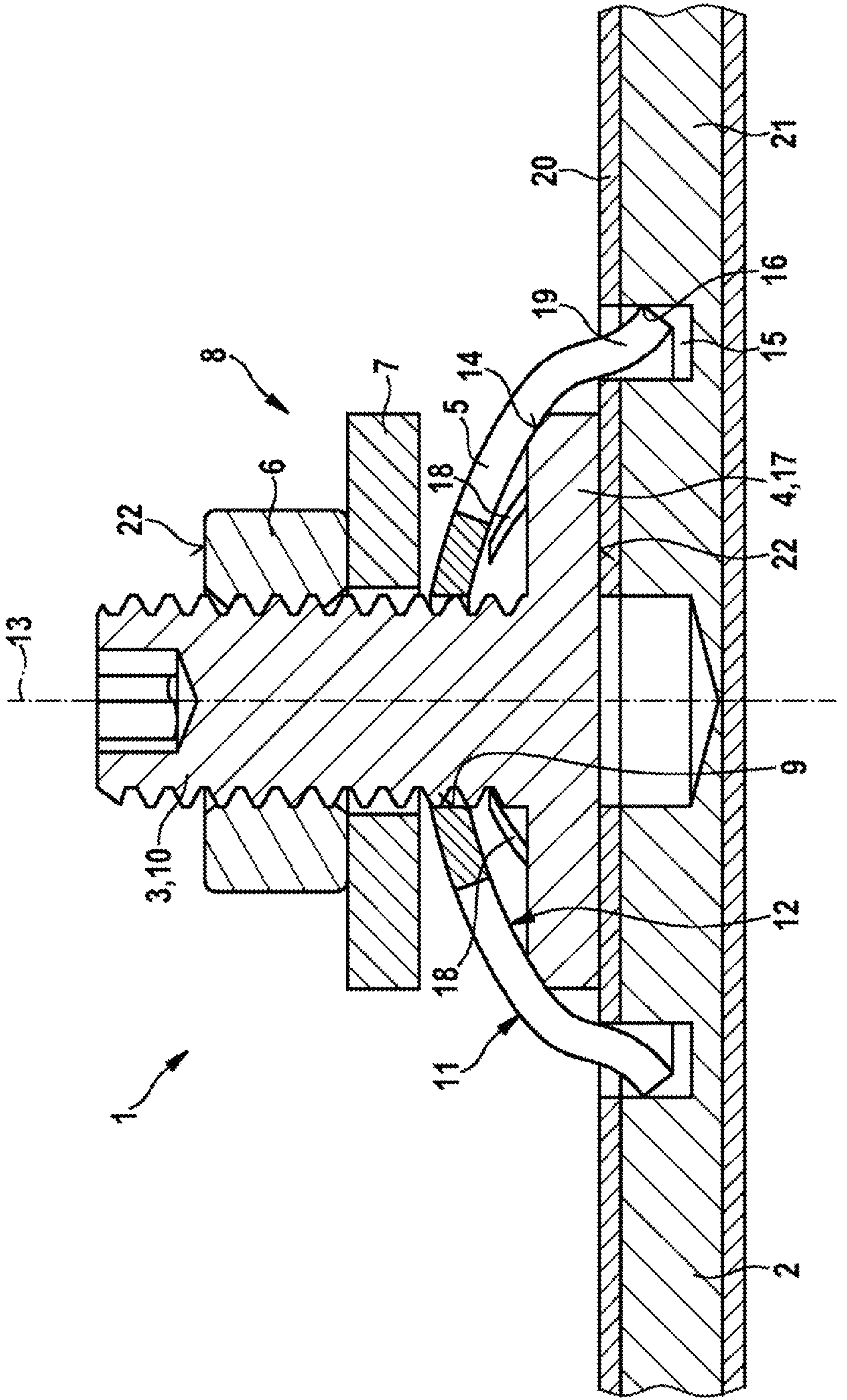
FIG. 1 shows an axial section of a fastener according to the invention in a non-expanded state in a component in a first fastening configuration of a first exemplary embodiment.
Figure 2:
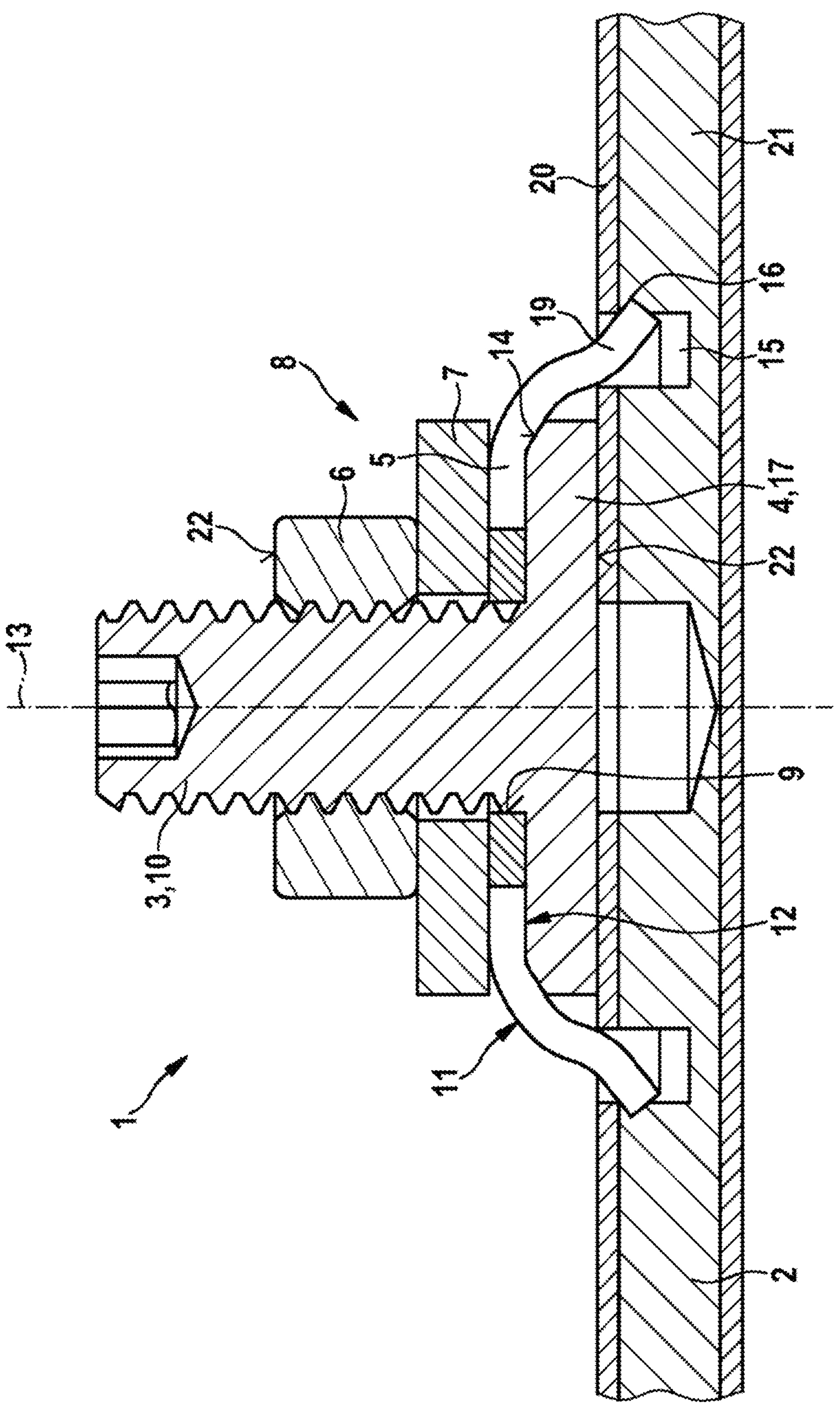
FIG. 2 shows the fastener from FIG. 1 in an expanded state in the component.
Figure 3:
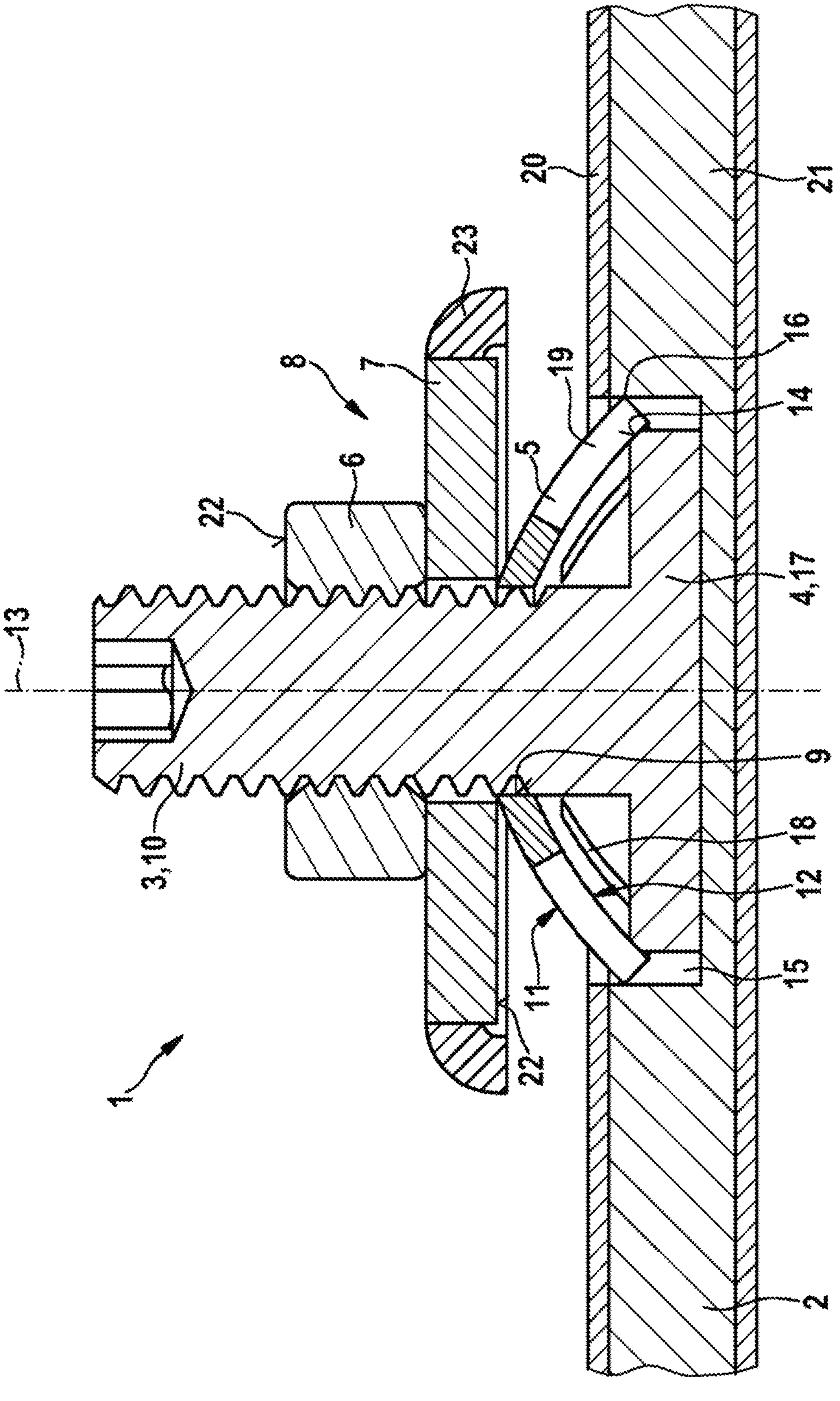
FIG. 3 shows the fastener according to the invention of FIG. 1 in a non-expanded state in the component of FIG. 1 in a second fastening configuration of a second embodiment.
Figure 4:
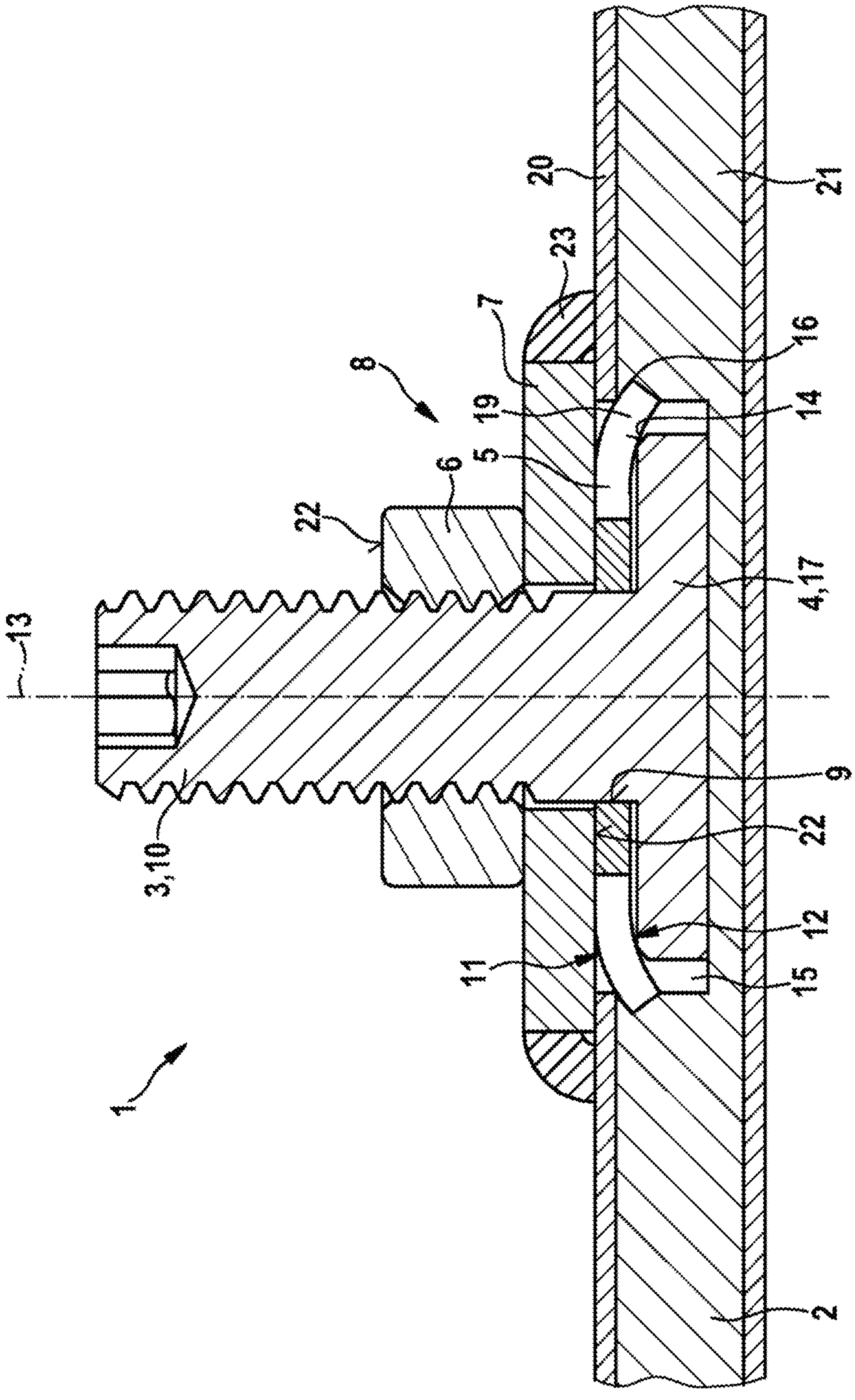
FIG. 4 shows the fastening configuration of FIG. 3 in the expanded state.

The fastener 1 according to the invention shown in the drawing is provided for fastening to a thin plate or for fastening the thin plate to, for example, a facade (not shown) with the aid of the fastener 1. The plate is generally designated here as the component 2. In the following, the same reference signs are used for both exemplary embodiments for reasons of clarity and only the differences are mentioned. A first fastening configuration is shown in FIGS. 1 and 2 as a first exemplary embodiment and a second fastening configuration is shown in FIGS. 3 and 4 as a second exemplary embodiment.

The fastener 1 comprises a screw 3 with a circular disk-shaped screw head 4, a bell-shaped claw 5 and a nut 6 with a washer 7 as a tensioner 8.

The claw 5 has the shape of a two-dimensionally curved dome, which is referred to here as bell-shaped. The term "bell-shaped" refers to a hollow rotational body or a shell of a rotational body, whose generating curve is an arc or a line curved in one direction. A straight line as the generating element of the rotational body is also possible (not shown). In the exemplary embodiment, the line that generates the rotational body forming the claw 5 or the bell shape of the claw 5 has a bend or curve near its outer end in a direction opposite to the other generating line. That is, the bell-shaped claw 5 comprises—in the exemplary embodiment—an annular section on its outer edge 16 with a curvature that is opposite to a curvature of the claw 5 within the annular section on the outer edge 16 of the claw 5. Cutting elements are arranged on the outer edge 16 of the claw 5 (not shown).

A convex side of the claw 5 will hereafter be designated as the outer side 11 and a concave side of the claw 5 as the inner side 12.

The claw 5 comprises a central hole 9 through which a screw shaft of the screw 3 passes coaxially, which will be designated here in general terms as the threaded shaft 10. The circular disk-shaped screw head 4 is located on or in the inner side 12 of the claw 5. The nut 6 is screwed onto the screw shaft or threaded shaft 10 on the outer side 11 of the claw 5 and the washer 7 is arranged between the nut 6 and the claw 5 on the threaded shaft 10. An axis of the threaded shaft 10, to which the claw 5 is arranged coaxially, forms a tensioning axis 13 of the fastener 1 according to the invention.

A circumference of the screw head 4 or a transition from the circumference to an underside of the screw head 4 facing the claw 5 forms a counter bearing 14—circular in the exemplary embodiment—for the claw 5. The transition from the circumference to the underside of the screw head 4 forming the counter bearing 14 can, for example, have an edge or a chamfer as in the exemplary embodiment or can be rounded, for example.

The circular disk-shaped screw head 4 forms a counter bearing plate 17 with the annular counter bearing 14 on its circumference. The screw shaft forming the threaded shaft 10 of the fastener 1 is torsion-resistant and tension-resistant, in the exemplary embodiment in one piece with the screw head 4 forming the counter bearing plate 17.

For fastening the fastener 1 according to the invention in the first fastening configuration of the first exemplary embodiment, shown in FIGS. 1 and 2, the component 2 has a circular annular groove, which will be designated hereafter in general terms as the recess 15 of the component 2 or in the component 2. For example, a circular countersink is also possible (not shown). The circular shape is not mandatory in every case; for example, a polygonal or multi-sided recess in component 2 is also possible (not shown).

For fastening to the component 2, the outer edge 16 of the claw 5 is inserted into the recess 15 of the component 2 and the claw 5 is expanded in a manner to be described. Upon the fastening of the fastener 1 to the component 2, the concave inner side 12 of the bell-shaped claw 5 and the screw head 4 face the component 2. The screw head 4 is located outside the component 2 on or in the inner side 12 of the claw 5 between the claw 5 and the component 2.

For expanding the claw 5, the nut 6, which together with the washer 7 forms the tensioner 8 of the fastener 1 according to the invention, is screwed onto the threaded shaft 10 in the direction of the claw 5. The axial movement of the clamp 8 in the direction of the claw 5 and in the direction of the counter bearing 14 is also referred to here as a movement in a tensioning direction. The nut 6 acts upon the claw 5 via the washer 7 in the direction of an end face of the screw head 4 facing the claw 5, which can also be designated as the underside of the screw head 4. During or for expanding, the nut 6 or the washer 7 acts upon the claw 5 in an annular region within the counter bearing 14 that surrounds the center hole 9 and thus also the tensioning axis 13 in the direction of the screw head 4 comprising the counter bearing 14, i.e. in the tensioning direction.

For expanding, the claw 5 is clamped between the screw head 4 and the tensioner 8 and pressed against the annular counter bearing 14 in the tensioning direction, i.e. axially to the tensioning axis 13. During or for expanding, the bell-shaped claw 5 is pressed flatter, i.e. its axial height and curvature are reduced. The claw 5 pivots about the counter bearing 14, which forms the annular pivot line surrounding the threaded shaft 10 and the tensioning axis 13 outside the center hole 9 of the claw 5. Due to pivoting about the counter bearing 14 or the annular pivot line, the outer edge 16 of the claw 5 moves radially outwards, increasing its radial distance from the tensioning axis 13. Due to the flattening of the bell-shaped claw 5 upon expansion or by pivoting about the annular counter bearing 14, the outer edge 16 of the claw 5 not only moves radially outwards, but also axially, i.e. parallel to the tensioning axis 13 against the tensioning direction, i.e. in the direction of the nut 6 and the washer 7, which together form the tensioner 8. The claw 5 moves the screw head 4 in the direction of the component 2, to which the fastener 2 is fastened by expanding its claw 5 in the recess 15. In the exemplary embodiment, the claw 5 acts upon or tensions the screw head 4 against the component 2 upon expansion.

The pivoting of the claw 5 about the annular counter bearing 14 during the expansion of the claw 5 does not have to be exclusively a rotational pivoting movement, but can also comprise a translational rolling movement of the claw 5 on the annular counter bearing 14, in particular if the counter bearing 14 has a chamfer or is rounded, as in the exemplary embodiment. That is, the annular counter bearing 14 or, more precisely, the annular leg line formed on the counter bearing 14, on which the claw 5 rests on the counter bearing 14, can change its radius during expansion, the counter bearing 14 "wanders" or shifts radially upon expansion.

The screw head 4, which is circular in the exemplary embodiment and forms the counter bearing plate 17 of the fastener 1 according to the invention, is flat in the exemplary embodiment and comprises a flat underside and a flat upper side. The flat upper side of the counter bearing plate 17 facing the component 2 is acted upon or tensioned axially against the component 2 by the expansion of the claw 5 towards the tensioning axis 13 and stabilizes the fastener 1 and in particular its threaded shaft 10 against tilting from its position projecting at right angles from the component 2. The upper side of the screw head 4 forming the counter bearing plate 17, which is in contact with the component 2, forms a flat contact surface of the fastener 1 in a radial plane to the tensioning axis 13 for contact with the component 2. The underside and the upper side of the screw head 4 are—in the exemplary embodiment flat—end faces of the counter bearing plate 17.

In order to be able to expand the claw 5 with less force, it comprises slots 18 that extend inwards from its outer edge 16 over the counter bearing 14. In the exemplary embodiment, the slots 18 run radially, although this is not essential for the invention. Likewise, in contrast to the exemplary embodiment, the slots 18 do not have to be straight. The slots 18 divide the bell-shaped claw 5 into strip-shaped expansion segments 19, which extend from inside the counter bearing 14—radially in the exemplary embodiment—outwards to the outer edge 16 of the claw 5. Upon the expansion of the claw 5, the expansion segments 19—which are strip-shaped in the exemplary embodiment—pivot about the circular counter bearing 14 as described above, wherein, due to the pivoting, the outer ends of the expansion segments 19 move radially outwards and at the same time axially in the direction of the tensioner 8. Due to the latter movement, the claw 5 tensions the screw head 4 with its upper side, which forms the flat contact surface of the fastener 1, against the component 2 upon expansion.

Upon expansion, the expansion segments 19 of the claw 5 pivot about the circular counter bearing 14, which can also be understood as pivoting of the expansion segments 19 about pivot axes tangential to the circular counter bearing.

The underside of the screw head 4 facing the claw 5, which forms the counter bearing plate 17, and the washer 7, which is part of the tensioner 8, are flat. As a result, the claw 5 can be pressed flat inside the counter bearing 14, i.e. its curvature can be reduced until the claw 5 is flat inside the counter bearing 14. Radially outside the counter bearing 14, the claw 5 remains two-dimensionally curved and the expansion segments 19 remain curved.

In the exemplary embodiment, the outer edge 16 of the bell-shaped claw 5 protrudes axially beyond the upper side of the screw head 4 by approximately 2 mm and no more than approximately 3 mm. As a result, the fastener 1 according to the invention requires only a shallow recess 15 for its fastening to the component 2 and can be fastened to a thin component 2, for example to a plate with a thickness of only 5 mm.

If the plate or the component 2 comprises a solid cover layer 20 and a core 21 or the like with less strength, the outer edge 16 with the cutting elements of the claw 5 formed on it or the outer ends of the expansion segments 19 form into the core 21 or the like of the component 2 upon the expansion of the claw 5 and engage under or behind the more stable cover layer 20. This achieves a form fit of the fastening of the fastener 1 in the recess 15 of the component 2 in addition to a force fit, which improves the hold of the fastener 1 on the component 2.

The nut 6, which is part of the tensioner 8, comprises flat, circular annular end faces. An end face of the nut 5 or of the clamp 8 facing away from the claw 5 forms a flat contact surface 22 for the facade (not shown) or the like, to which the plate forming the component 2 can be fastened with the aid of the fastener 1 according to the invention, or a contact surface 22 for an attachment part or the like (not shown), which can be fastened to the attachment part or the like with the aid of the fastener 1 according to the invention.

The fastener 1, which is secured by the expansion of its claw 5 in the recess 15 of the component 2, forms a fastening arrangement according to the invention.

FIGS. 3 and 4 show a second exemplary embodiment in the form of a second fastening configuration of the fastener 1 on the component 2. The second fastening configuration differs from the first fastening configuration, which is shown in FIGS. 1 and 2, substantially in that the counter bearing plate 17, or the screw head 4, is arranged below the cover layer 20 and thus inside the core 21. In the second exemplary embodiment, the recess 15 is designed as a cylindrical countersink in the component 2. In the second fastening configuration, the washer 7 is dimensioned in such a way that the washer 7 comes into contact with the cover layer 20 in the expanded state of FIG. 4. This additionally stabilizes the fastener 1 in the component 2 and increases the holding values. As a result, the relatively soft aluminum cover layer 20 is prevented from being bulged or bent open by the claw 5 in the opposite direction to the tensioning direction. In the second exemplary embodiment, the washer 7 of the fastener 1 comprises a sealing element 23 in the form of a circumferential seal about the washer 7. The sealing element 23 extends in the direction of the cover layer 20 and is in contact with it in the tensioned state, as shown in FIG. 4. This prevents moisture from penetrating into the recess 15 between the cover layer 20 and the washer 7. At the very least, moisture penetration is greatly inhibited. Between the nut 6 and the washer 7, a flat attachment part in particular can be arranged (not shown).

LIST OF REFERENCE SIGNS

1 Fastener
2 Component
3 Screw
4 Screw head
5 Claw
6 Nut
7 Washer
8 Tensioner
9 Center hole
10 Threaded shaft
11 Outer side
12 Inner side

13 Tensioning axis
14 Counter bearing
15 Recess
16 Outer edge
17 Counter bearing plate
18 Slot
19 Expansion segment
20 Cover layer
21 Core
22 Contact surface
23 Sealing element

The invention claimed is:

1. A fastener for fastening in a recess of a component, comprising a bell-shaped claw and comprising a tensioning axis that passes through the bell-shaped claw, wherein the fastener comprises a tensioner on an outer side of the bell-shaped claw and a counter bearing on an inner side of the bell-shaped claw at a radial distance from the tensioning axis between an outer edge of the bell-shaped claw and the tensioning axis, and in that, starting from an untensioned state, the bell-shaped claw is configured to be acted upon by the tensioner in a tensioning direction at a smaller radial distance from the tensioning axis than the radial distance of the counter bearing from the tensioning axis along the tensioning axis in such a way that the bell-shaped claw is pressed against the counter bearing and thereby pivots about a pivot axis surrounding the tensioning axis or about one or more pivot axis/es tangential to the tensioning axis on the counter bearing, as a result of which the outer edge of the bell-shaped claw moves radially away from the tensioning axis.

2. The fastener according to claim 1, wherein the bell-shaped claw becomes flatter as a result of being acted upon by the tensioner.

3. The fastener according to claim 1, wherein the bell-shaped claw projects axially no more than 3 mm beyond the counter bearing.

4. The fastener according to claim 1, wherein the fastener comprises an annular counter bearing surrounding the tensioning axis on the inner side of the bell-shaped claw.

5. The fastener according to claim 1, wherein the bell-shaped claw comprises a hole surrounding the tensioning axis, through which a threaded shaft passes, which defines the tensioning axis and enables an axial movement of the tensioner relative to the threaded shaft by a screwing movement, in such a way that the tensioner acts upon the bell-shaped claw against the counter bearing.

6. The fastener according to claim 1, wherein the bell-shaped claw comprises slots in the outer edge of the bell-shaped claw which extend inwards in the direction of the tensioning axis beyond the counter bearing and divide the bell-shaped claw into expansion segments.

7. The fastener according to claim 1, wherein the fastener comprises a counter bearing plate, the circumference of which forms the counter bearing.

8. The fastener according to claim 7, wherein an end face of the counter bearing plate facing the bell-shaped claw is level.

9. The fastener according to claim 1, wherein an end face of the tensioner facing the bell-shaped claw is level.

10. The fastener according to claim 1, wherein an end face of the tensioner facing away from the bell-shaped claw is level.

11. The fastener according to claim 1, wherein cutting elements are formed on the outer edge of the bell-shaped claw.

12. A fastening arrangement with a fastener according to claim 1 and with the component having the recess, wherein the recess comprises a circumferential wall and in that the bell-shaped claw of the fastener is expanded in the recess of the component by tensioning the bell-shaped claw with the tensioner against the counter bearing in such a way that the outer edge of the bell-shaped claw is pressed radially outwards and against or into the circumferential wall of the recess in the component.

13. The fastening arrangement according to claim 12, wherein the component comprises a cover layer that is thinner than the recess in depth, in that, when the bell-shaped claw is expanded in the recess, a counter bearing plate rests flat against an outer side of the cover layer of the component or is arranged inside the recess and below the cover layer, and in that the outer edge of the bell-shaped claw expanded in the recess engages behind the cover layer.

14. The fastening arrangement according to claim 12, wherein the component is a thin plate and the recess is at least half as deep as the thickness of the plate.

15. The fastening arrangement according to claim 12, wherein the recess is an annular groove or a cylindrical countersink.

* * * * *